United States Patent [19]
Yazaki et al.

[11] Patent Number: 5,867,237
[45] Date of Patent: Feb. 2, 1999

[54] POLYMER DISPERSED LIQUID CRYSTAL DISPLAY DEVICE AND METHOD OF PRODUCING A DISPLAY DEVICE

[75] Inventors: Masayuki Yazaki; Hidekazu Kobayashi; Shuhei Yamada; Hidehito Iisaka; Yutaka Tsuchiya; Eiji Chino, all of Suwa, Japan

[73] Assignee: Seiko Epson Corporation, Tokyo, Japan

[21] Appl. No.: 693,233
[22] PCT Filed: Dec. 12, 1995
[86] PCT No.: PCT/JP95/02536
§ 371 Date: Aug. 12, 1996
§ 102(e) Date: Aug. 12, 1996
[87] PCT Pub. No.: WO96/18929
PCT Pub. Date: Jun. 20, 1996

[30] Foreign Application Priority Data
Dec. 12, 1994 [JP] Japan ................................. 6-307993

[51] Int. Cl.⁶ .......................... G02F 1/1337; G02F 1/137
[52] U.S. Cl. ........................ 349/86; 349/110; 349/128; 349/129
[58] Field of Search .................. 349/86, 88, 89, 349/92, 93, 94, 124, 126, 128, 129, 136; 430/20

[56] References Cited

U.S. PATENT DOCUMENTS

| | | | |
|---|---|---|---|
| 4,084,884 | 4/1978 | Raynes | 349/128 |
| 5,305,126 | 4/1994 | Kobayashi et al. | |
| 5,579,140 | 11/1996 | Yamahara et al. | 349/124 |
| 5,680,185 | 10/1997 | Kobayashi et al. | 349/88 |

FOREIGN PATENT DOCUMENTS

| | | |
|---|---|---|
| 0 488 116 | 6/1992 | European Pat. Off. . |
| 0 497 619 A2 | 8/1992 | European Pat. Off. . |
| 58501631 | 9/1983 | Japan . |
| 4227684 | 8/1992 | Japan . |
| A-5-11246 | 1/1993 | Japan . |
| 5119302 | 5/1993 | Japan . |
| A-5-196943 | 8/1993 | Japan . |
| A-5-232474 | 9/1993 | Japan . |
| A-6-265903 | 9/1994 | Japan . |
| A-7-294934 | 11/1995 | Japan . |

OTHER PUBLICATIONS

K. Sumiyoshi et al., "A Complementary TN–LCD With Wide–Viewing–Angle Gray Scale," *Journal of the Society for Information Display*, vol. 2, No. 1, Apr. 1, 1994., pp. 31–36.

*Primary Examiner*—William L. Sikes
*Assistant Examiner*—Tai V. Duong
*Attorney, Agent, or Firm*—Oliff & Berridge, PLC

[57] ABSTRACT

Reflective pixels composed of chromium are formed on a substrate and a polyimide film is provided on the substrate. Rubbing in two directions is conducted through a mask rubbing process. Transparent pixel electrodes, composed of indium tin oxide (ITO), are formed on a substrate, a polyimide film is formed on another substrate, and orientation processing is conducted in the same direction over the entire surface. A polymer dispersion liquid crystal is provided between these two substrates. The liquid crystal does not contain a chiral agent. The liquid crystal is divided into a left twist area having a left twist orientation state and a right twist area having a right twist orientation state. Between the substrates, the polymer and the liquid crystal are mutually orientation dispersed.

18 Claims, 6 Drawing Sheets

CROSS-SECTIONAL VIEW OF THE LIQUID CRYSTAL DISPLAY DEVICE OF THE SECOND EMBODIMENT

PLANAR VIEW OF THE LIQUID CRYSTAL DISPLAY DEVICE OF THE SECOND EMBODIMENT

CROSS-SECTIONAL VIEW OF THE LIQUID CRYSTAL DISPLAY DEVICE OF THE SECOND EMBODIMENT

PLANAR VIEW OF THE LIQUID CRYSTAL DISPLAY DEVICE OF THE SECOND EMBODIMENT

MASK 1

MASK 2

POLYMER DISPERSED LIQUID CRYSTAL DISPLAY DEVICE AND METHOD OF PRODUCING A DISPLAY DEVICE

BACKGROUND OF THE INVENTION

1. Field of the Invention

The present invention relates to a liquid crystal display device and a method for producing a liquid crystal display device. More particularly, the present invention relates to a liquid crystal display device comprising the display component of an information equipment terminal, television or home appliance product, and a method of producing the liquid crystal display device.

2. Description of Related Art

In recent years, as information equipment has become more compact and lightweight, display devices to be mounted on such equipment have been sought that consume less power. Liquid crystal display devices, by means of the TN mode, are utilized as reflective displays in small display capacity equipment. Liquid crystal display devices, by means of the FTN mode, are utilized in mid-range display capacity equipment. Furthermore, uses wherein an information input apparatus, such as a tablet or the like, is included on the reflective-type display are also expanding, and brightness and good visibility are required in reflective-type liquid crystal display devices.

However, because TN-format and FTN-format liquid crystal display devices that use conventional polarizing plates have low light utilizing efficiency, the problem arises that these displays become dark when made reflective. Moreover, an extremely dark display results when an information input apparatus, such as a tablet or the like, is included. In addition, because a reflective plate is placed over the polarizing plate on the back surface of the substrate, positioned on the back side of the device, in order to make a reflective model with TN format or FTN format, double images occur in the display, small characters are unclear, and there are problems with visibility.

On the other hand, bright reflective-type displays that do not use polarizing plates have come to be developed recently. For example, a liquid crystal display device that uses a polymer dispersion liquid crystal in which liquid crystal and polymer are mutually dispersed, and that performs control so that the display is transparent when an electric field is applied and the light is scattered when no electric field is applied has been disclosed (Japanese Laid-Open Patent Publication Sho 58-501631). Liquid crystal display devices that perform control so that the light is scattered when an electric field is applied and the display is transparent or light is absorbed when no electric field is applied have also been disclosed (European Patent Application EPO 488116A2, Japanese Laid-Open Patent Publication Hei 4-227684, Japanese Laid-Open Patent Publication Hei 5-119302).

In particular, in the polymer dispersion-type liquid crystal display device using a polymer dispersion liquid crystal disclosed in European Patent Application EPO 488116A2, in which the liquid crystal and polymer are mutually orientation dispersed, it is possible to also use the electrodes as light reflecting surfaces because no polarizing plate is used. In this case, visibility, high precision and brightness, which cannot be achieved in TN and FTN modes that require polarizing plates, are obtained, and it is possible to obtain a reflective display with superior display quality.

However, the conventional art that has been disclosed with regard to polymer dispersion type liquid crystal display devices use polymer dispersion liquid crystal in which the liquid crystal and polymer are mutually orientation dispersed. Although it is possible to resolve the problems of a liquid crystal display device that uses a polarizing plate, it is necessary for the liquid crystal to be twisted by not less than 360° in order to obtain sufficient scattering characteristics and to secure brightness. As a result, the problem arises that the driving voltage becomes high.

For example, large capacity displays are possible by forming active devices such as TFT (thin film transistor) or MIM (metal-insulator-metal) devices at each pixel and providing electric signal control at each pixel. However, because the driving voltage of the polymer dispersion liquid crystal is high, it is difficult to drive the liquid crystal so that the liquid crystal responds adequately from the standpoint of the voltage resistance of active devices. The problems also arise that the contrast ratio tends to fall and driving drivers are necessary that can withstand high voltages.

In addition, because of the orientation dispersion structure, the problem arises that there is directivity in the scattering. Directivity is when the light scattering efficiency changes based on the direction of the external incident light. For example, the brightness changes as the panel is rotated, and the problem then arises that the visibility is easily influenced by the usage environment. To the extent that the twisting of the liquid crystal is small, the directivity is larger. Accordingly, the twisting of the liquid crystal should be made larger in order to resolve this problem, but when this is done, the driving voltage becomes large. Consequently, making the twisting larger is impossible from the standpoint of the driving voltage.

Furthermore, when large quantities of a chiral agent are added in order to create a large twisting force, the problem arises that hysteresis is created in the electro-optical properties.

The present invention was made in order to solve these types of problems, and its purpose is to provide a liquid crystal display device, through controlling to a new orientation state a liquid crystal that is mutually orientation-dispersed with a polymer. The liquid crystal display device can be operated at low voltage, is bright, has a high contrast ratio, has improved scatter directivity, and has visibility that has only low dependence on the usage environment and which has superior portability. The present invention is also directed to the method of producing such a liquid crystal display device.

SUMMARY OF THE INVENTION

In order to resolve the above and other problems, the present invention provides: a liquid crystal display device, of the type comprised of a liquid crystal and an anisotropic polymer, the orientations of which are mutually dispersed, interposed between a first substrate in which pixel electrodes are formed and the surface is orientation processed, and a second substrate, in which electrodes facing these pixel electrodes are formed and the surface is orientation processed; wherein the pixels are divided into at least a right-twist orientation area and a left-twist orientation area, and the liquid crystal is right-twist oriented between the first substrate and the second substrate in the right-twist orientation area, and is left-twist oriented between the first substrate and the second substrate in the left-twist orientation area.

Thus, the pixels are divided at least into a right-twist orientation area and a left-twist orientation area, with the liquid crystal having a right-twist orientation in the right-twist orientation area and a left-twist orientation in the left-twist orientation area. Consequently, the directivity of the scattering becomes small. Accordingly, it is not necessary to make the twisting of the liquid crystal larger in order to resolve the problem of directivity. As a result, driving is possible at low voltages. In addition, it is not necessary to add large quantities of the chiral agent in order to make the twisting of the liquid crystal larger. As a result, even if hysteresis is created in the electro-optical properties, this can be controlled.

It is preferable for the size of the twisting angle of the liquid crystal in the right-twist orientation area and the size of the twisting angle of the liquid crystal in the left-twist orientation area to be substantially equivalent. In this way, the directivity of the scattering is made extremely small.

It is preferable for the orientation direction of one of the first substrate and the second substrate in the right-twist orientation area and the orientation direction of one of the first substrate and the second substrate in the left-twist orientation area to be the same. It is also preferable for the orientation direction of the other of the first substrate and the second substrate in the right-twist orientation area and the orientation direction of the other of the first substrate and the second substrate in the left-twist orientation area to be opposite.

It is preferable for the twisting angle of the liquid crystal to be 45° to 90°. When the angle is smaller than 45°, the scattering directivity is strong and the visual properties are poor. In addition, when 90° is exceeded, a reverse twist domain is created.

It is preferable for a light-shielding layer to be formed on at least one of the first substrate and the second substrate of the boundary between the right-twist orientation area and the left-twist orientation area. In this way, the discrimination line of the orientation boundary is shielded from the light, and a uniform display is obtained.

It is preferable for a light-shielding layer to be formed on at least one out of the first substrate and the second substrate between pixels. In this way, light leaks caused by the liquid crystal response above the arranged line are shielded.

It is preferable for either the pixel electrodes of the first substrate or the electrodes of the second substrate to be formed of a reflective material. The present invention is preferably applied to a reflective-type liquid crystal display device.

It is preferable for the liquid crystal to not contain a chiral agent. This is because the twisting direction matches either left or right when the chiral agent is included.

In addition, with the present invention a method of producing a liquid crystal display device is provided, said method comprising:
  a procedure for forming pixel electrodes in the first substrate;
  a procedure for forming electrodes in the second substrate, that face the pixel electrodes;
  a procedure for orienting, in a first direction, one of the first substrate and the second substrate in a first area of the pixel electrodes;
  a procedure for orienting, in a second direction opposite the first direction, one of the first substrate and the second substrate in a second area different from the first area of the pixel electrodes;
  a procedure for orienting the other of the first substrate and the second substrate;
  then, a procedure for forming a vacuum panel using the first substrate and the second substrate;
  a procedure that places a liquid crystal mixture material composed of a polymer or polymer precursor and a liquid crystal compound between the first and second substrates of the vacuum panel; and
  then, a procedure for separating the polymer from the liquid crystal mixture material and mutually separating the liquid crystal and the polymer.

In this way, by orienting in a first direction one of the first substrate and the second substrate in a first area of the pixel electrodes, orienting in a second direction opposite the first direction one of the first substrate and the second substrate in a second area that is different from the first area of the pixel electrodes, orienting the other of the first substrate and the second substrate, forming a vacuum panel using the first substrate and the second substrate, and placing a liquid crystal mixture material composed of a polymer or polymer precursor and a liquid crystal compound between the first and second substrates of the vacuum panel, a liquid crystal display device is made. The device has pixel electrodes that are partitioned into a first orientation area and a second orientation area, with the liquid crystal mixture material having a right-twist orientation between the first substrate and the second substrate in the first orientation area, and a left-twist orientation between the first substrate and the second substrate in the second orientation area. Furthermore, by then separating the polymer out from the liquid crystal mixture material and mutually separating the liquid crystal and the polymer, it is possible to keep the orientation state of the liquid crystal in the orientation state of the liquid crystal mixture material prior to mutual separation, with the liquid crystal having a right-twist orientation between the first substrate and the second substrate in the first orientation area and a left-twist orientation between the first substrate and the second substrate in the second orientation area.

DETAILED DESCRIPTION OF PREFERRED EMBODIMENTS

First Embodiment

Figure 1A:
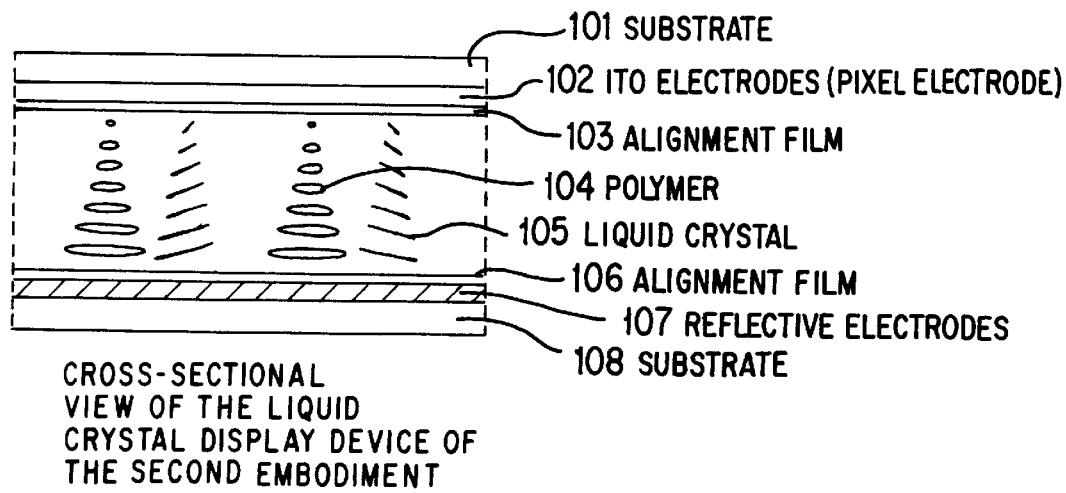
FIG. 1A and FIG. 1B are respectively a cross-sectional view and a planar view of the liquid crystal display device of a first embodiment of the present invention.
Figure 1B:
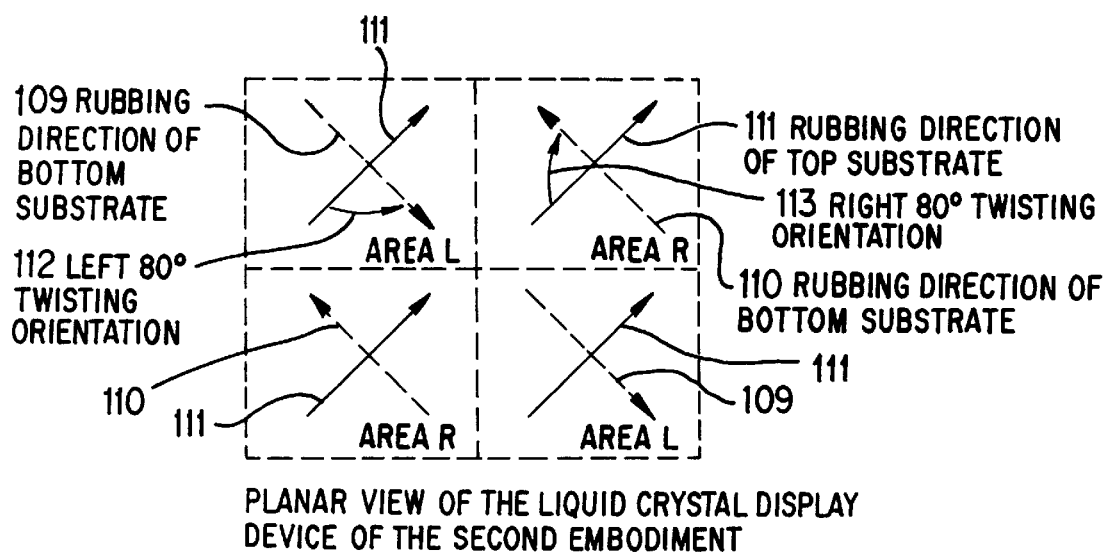

A cross-sectional view of the liquid crystal display device of the present invention is shown in FIG. 1A. In addition, a planar view, as seen from the top substrate 101, is shown in FIG. 1B.

Chrome is formed to a thickness of about 2000 angstroms through sputtering on the bottom substrate 108 and is then patterned to form a reflective pixel electrode 107 with 15 mm² of pixel surface area. Following this, Optomer AL 3046 (produced by Japan Synthetic Rubber Co. Ltd.) is flexographed as an orientation agent on substrate 108, and is then calcinated for one hour at 180° C. to form a polyimide film 106.

Figure 2A:
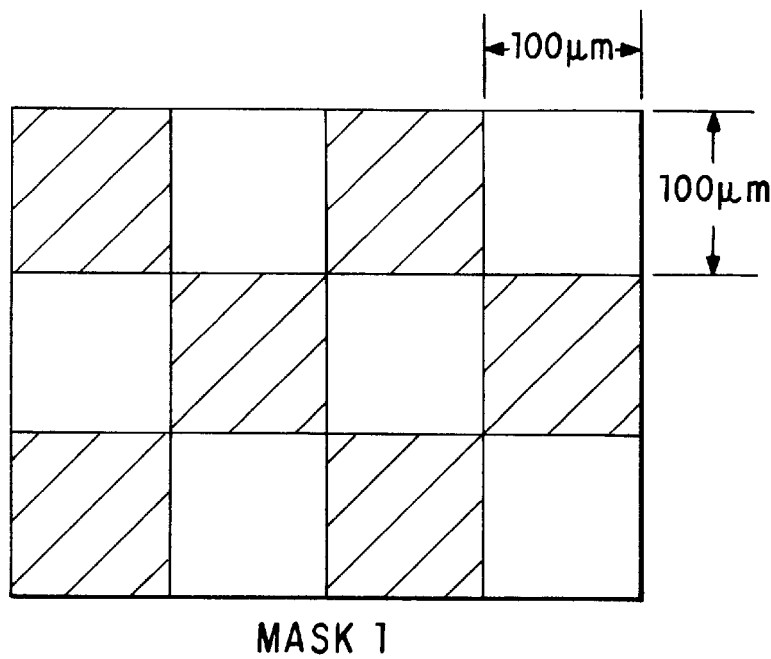
FIG. 2A and FIG. 2B are planar views of masks used in the first embodiment of the present invention.
Figure 2B:
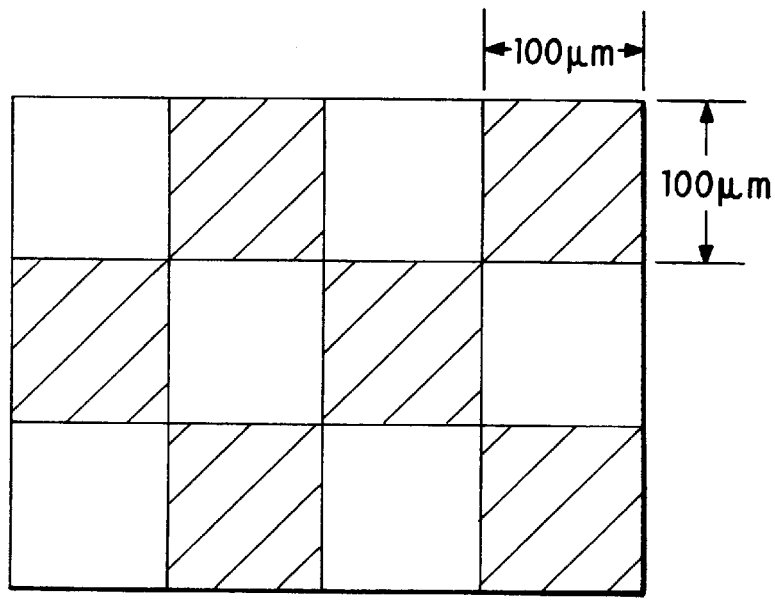

Next, the bi-directional rubbing process using the mask rubbing method will be described. First, a resist film is formed on the above-described substrate 108 and is then exposed using the mask 1 shown in FIG. 2A and is developed. Next, a rubbing process is conducted using a rotating rubbing apparatus, following which the resist film is peeled off, completing one cycle of the mask rubbing. The rubbing direction is indicated by reference number 109 in FIG. 1B. Following this, a resist film is again formed on the substrate 108 and is then exposed using the mask 2 shown in FIG. 2B and is developed. Next, a rubbing process is conducted using a rotating rubbing apparatus, following which the resist film is peeled off and the second cycle of the mask rubbing is completed. The rubbing direction is indicated by reference number 110 in FIG. 1B.

ITO (indium tin oxide) is formed to a thickness of about 1500 angstroms through sputtering on the top substrate 101 and is then patterned to form a transparent pixel electrode 102. Optomer Al 3046 (produced by Japan Synthetic Rubber Co. Ltd.) is flexographed as an orientation agent on the substrate 101 and is then calcinated for one hour at 180° C. to form a polyimide film 103. Next, the polyimide film 103 is oriented in the same direction over the entire surface by means of a rotating rubbing apparatus. The rubbing direction is indicated by reference number 111 in FIG. 1B.

Next, a vacuum panel is made by bonding and anchoring the perimeters of the two substrates with a spacing of 5 μm between the two substrates.

The angle formed by the bottom substrate rubbing direction 109 and the top substrate rubbing direction 111 is set at 89°, and the angle formed by the bottom substrate rubbing direction 110 and the top substrate rubbing direction 111 is set at 89°.

Next, the liquid crystal and polymer precursor compound that is sealed in this vacuum panel will be described. A mixture of TL-213 (produced by Merck & Co. Inc.) and MJ92786 (produced by Merck & Co. Inc.) in a 7:3 ratio was used as the liquid crystal (hereafter called liquid crystal A). In addition, M361, SI512 and M137 (all produced by Mitsui Toatsu Senryo K.K.) were mixed into this mixture in ratios of 1.4%, 1.7% and 0.4% by weight, respectively, as the bi-color pigments. A chiral agent was not added to the liquid crystal mixture. In addition, 7% by weight of biphenyl acrylate, with respect to the above liquid crystal compound, was used as the polymer precursor. The above was heated and mixed to achieve a liquid crystal state, and after this, was vacuum sealed in the above-described vacuum panel.

The liquid crystal mixture material that was sealed in the panel was divided into an area L with a left 89° twisting orientation 112 and an area R with a right 89° twisting orientation 113. Following this, the panel was irradiated for seven minutes by ultraviolet rays having a luminous intensity of 5 mW/cm² (wavelength 350 nm) to polymerize the polymer. This step separated the polymer from the liquid crystal mixture material and the liquid crystal display device of the present embodiment as shown in FIG. 1A and FIG. 1B was completed.

The liquid crystal 105 exhibited a state divided into a left 89° twisting orientation area L and a right 89° twisting orientation area R, the same as before ultraviolet ray irradiation. In addition, the fact that the polymer 104 and the liquid crystal 105 took on a structure that was mutually oriented and dispersed was verified by a polarizing microscope.

Figure 3:
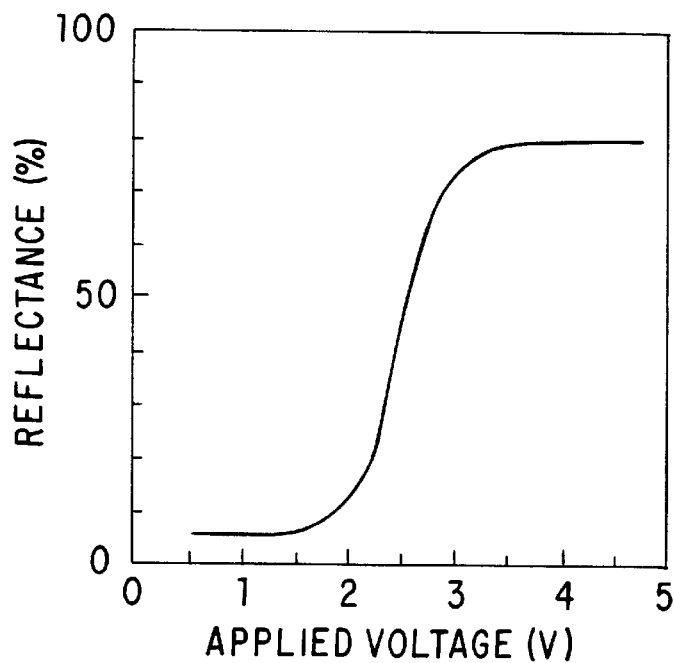
FIG. 3 is a graph showing the electro-optical properties of the liquid crystal display device of the first embodiment of the present invention.

FIG. 3 shows the electro-optical properties of the liquid crystal display device that was obtained by the present embodiment. The electro-optical properties exhibited threshold properties, and a normally black property was obtained wherein the reflectance increases by the voltage being applied. That is to say, when the voltage is off, a black display was obtained through the absorption of the bi-color pigment, and when a sufficient voltage was applied, the liquid crystal 105 was orientated in the direction of the electric field. Consequently, the orientation directions of the polymer and the liquid crystal differ, and points of discontinuity were created in the refractive index in the medium, so that a light scattering state was achieved. At this time, the absorption was extremely small because the bi-color pigment was also oriented in the direction of the electric field, so a white display was obtained.

Figure 4:
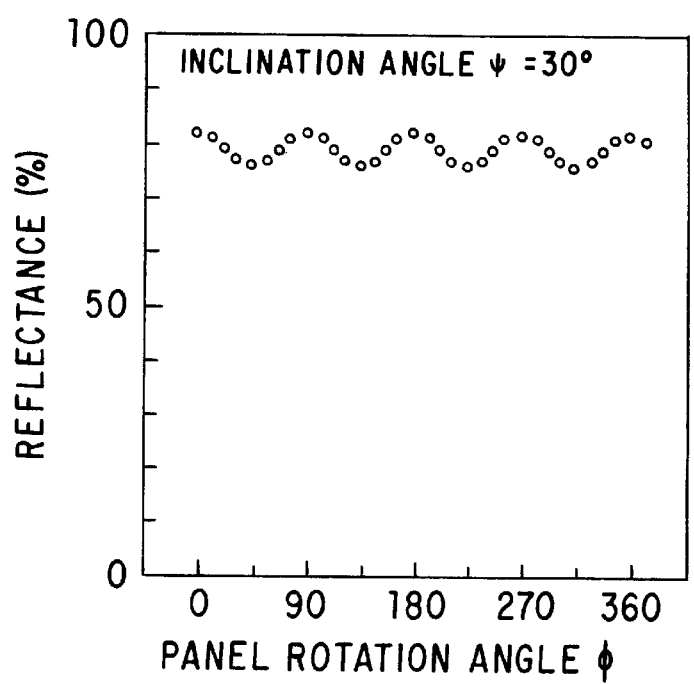
FIG. 4 is a graph showing the scattering directivity of the liquid crystal display device of the first embodiment of the present invention.
Figure 5:
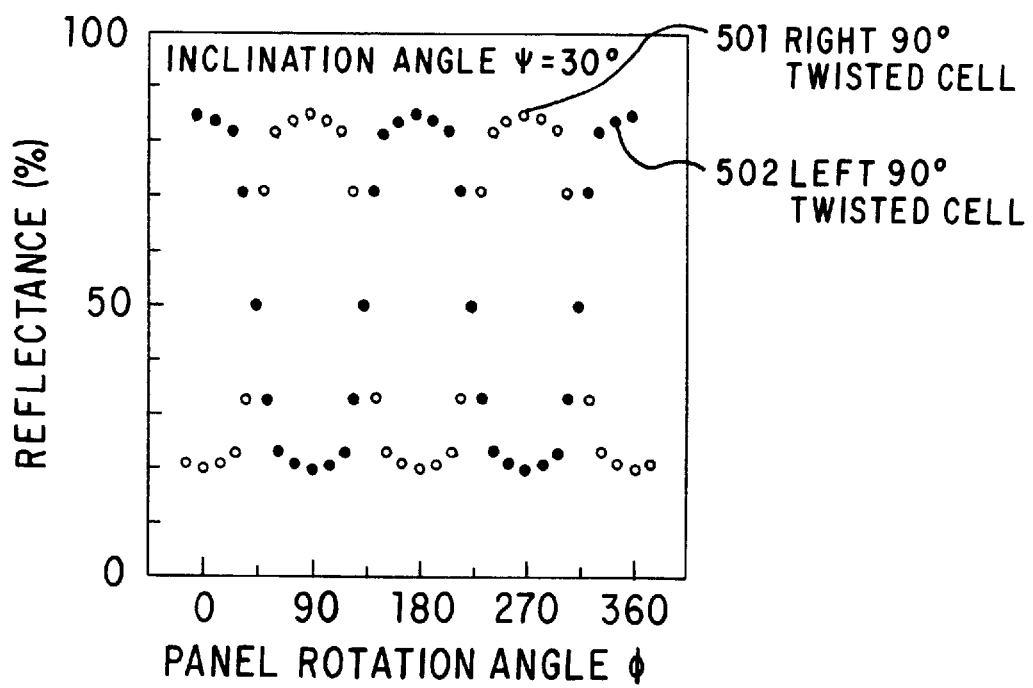
FIG. 5 is a graph showing the scattering directivity of one type of conventional liquid crystal display device.

Next, the results of measurements of the electro-optical properties of the liquid crystal display device of the present embodiment will be shown. The electro-optical properties were measured by applying a 100 Hz rectangular wave on the liquid crystal display device using a xenon lamp ring light source. This causes light to be incident from all directions (360°) from a direction inclined 30° from the normal direction (panel normal) of the liquid crystal display device surface (incident angle 30°). The response of the reflected light of the incident light is detected in the normal direction. The detected surface area was 2 mm in diameter. The reflectance of 100% was standardized at the luminosity of the entire dispersion plate surface. Hereafter, the threshold voltage value V10 was defined to be the voltage value when the reflectance is 10 with the maximum reflectance—minimum reflectance being standardized to 100. The saturation voltage value V90 was defined to be the voltage value when the reflectance is 90. In addition, the scattering directivity measured the change in the reflectance in the panel normal direction using parallel light rays and with the angle ψ between the parallel light rays and the panel normal and the panel rotation angle φ as parameters. With the liquid crystal display device of the present embodiment, V10 was 1.7 V, V90 was 3.2 V and the maximum reflectance was 79%. In addition, with regard to the scattering directivity, the results of measurements when the saturation voltage 3.2 V was applied are shown in FIG. 4. In addition, the scattering directivity of a conventional liquid crystal display device having the same structure as the present embodiment but wherein orientation is not divided and only one direction is rubbed and only one direction out of left and right is caused to be twist oriented is shown in FIG. 5 with respect to left 89° twist cells and right 89° twist cells. In this conventional liquid crystal display device, where the orientation is not divided and only one direction is rubbed and only one direction out of left and right is caused to be twist oriented, twisting of at least 360° is necessary in order to obtain scattering properties equal to those of the present embodiment, and in this case, V10 was 3.8 V and V90 was 6.5 V.

As exhibited above, with the present embodiment, through a structure wherein a pixel is divided into areas in which the left and right twisting direction of the liquid crystal differs, the driving voltage was greatly reduced in a liquid crystal display device using a polymer dispersion liquid crystal in which the liquid crystal and polymer are mutually orientation dispersed. Furthermore, the maximum reflectance, which is an indicator of brightness, was high and the brightness was good. In addition, in the liquid crystal display device of the present embodiment, the scattering directivity was small and favorable, as shown in FIG. 4.

Accordingly, changes in the brightness caused by the method of positioning the panel disappear in uniform lighting and in environments where the light is strong from a specific direction, and the visual properties, portability and visibility were improved.

Second Embodiment

Figure 6A:
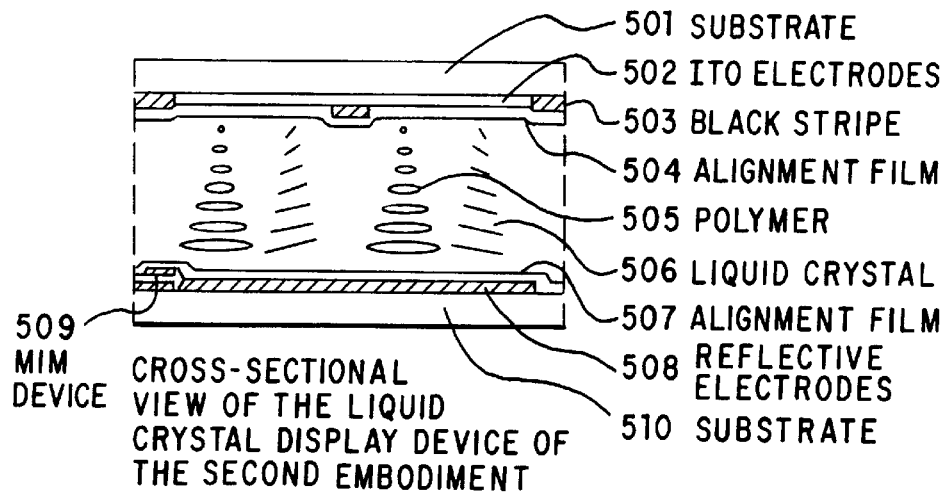
FIG. 6A and FIG. 6B are, respectively, a cross-sectional view and a planar view of the liquid crystal display device of a second embodiment of the present invention.
Figure 6B:
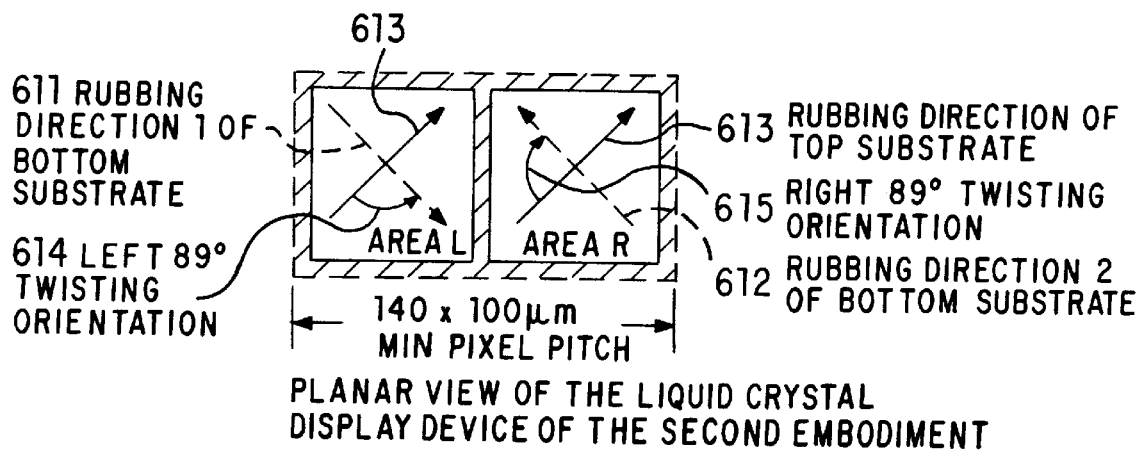

Hereafter, with the present embodiment an example is presented using the same structure as in the first embodiment including the orientation divided in the pixels. Further, a two terminal device (MIM) is formed on each pixel electrode and a light-shielding layer is formed on the top substrate at a position between the pixels and corresponding to the orientation division boundary. FIG. 6A and FIG. 6B, respectively, show the cross-sectional view and planar view of the liquid crystal display device of the present embodiment.

The bottom substrate 610 was a MIM substrate produced through a 2 photo process. In the substrate production process, Ta was sputtered and then was patterned (photo first procedure) into a desired shape. Then, the Ta was anodized and an insulating film of $Ta_2O_5$ was formed on the Ta surface. Next, Cr was sputtered and then was patterned (photo second procedure) into a desired shape. Then, MIM devices 608 composed of Ta—$Ta_2O_5$—Cr and reflective pixel electrodes 609 composed of Cr were formed.

On the other hand, ITO was sputtered on the top substrate 601 and was patterned into a stripe form, and an ITO electrode 602 was formed. Next, a black color resist that is used in the color filter was applied and patterned into the desired shape. A black stripe 603 was formed between the reflective pixel electrodes 609 and at a position corresponding to the orientation boundary in the reflective pixel electrodes. The black stripe at the orientation boundary had a width of 10 $\mu$m.

Next, Optomer AL3046 (produced by Japan Synthetic Rubber Co. Ltd.) was flexographed onto the two substrates 601 and 610 and then calcinated for one hour at 180° C., and polyimide films 604 and 607, respectively, were formed. Similar to the first embodiment, the rubbing direction of the top substrate 601 was in one direction (613 in the drawing), and the bottom MIM substrate 610 was rubbed in two directions through mask rubbing, so that the rubbing direction was divided into two (611 and 612 in the drawing). The division pitch corresponds to the pixel division, and the pixel pitch is 140×110 $\mu$m. The two substrates thus obtained where bonded and anchored about the substrate perimeter with a separation of 5 $\mu$m to produce a vacuum panel with a 5 inch diagonal. The rubbing axes of the top and bottom substrates 601 and 610 were respectively set at 89°.

Next, a liquid crystal mixture material composed of a liquid crystal containing a bi-color pigment and a polymer precursor was vacuum sealed into the above-described vacuum panel, the same as in the first embodiment. The liquid crystal mixture material that was sealed into the panel was divided, the same as in the first embodiment, into an area L with a left 89° twisting orientation 614 and an area R with a right 89° twisting orientation 615 corresponding to the mask pattern in each pixel. Following this, the panel was irradiated for 7 minutes by ultraviolet rays of luminous intensity of 5 mW/cm$^2$ (wavelength 350 nm), the polymer was separated from the liquid crystal mixture material, and the liquid crystal display device of the present embodiment as shown in FIG. 6A and FIG. 6B was completed.

The liquid crystal 606 exhibited a state divided into a left 89° twisting orientation area L and a right 89° twist orientation area R, the same as before ultraviolet ray irradiation. In addition, the fact that the polymer 605 and the liquid crystal 606 took on a structure that was mutually oriented and dispersed was verified by a polarizing microscope.

When the liquid crystal display device thus obtained was MIM driven with a 1/480 duty, the maximum reflectance was 62% and the contrast ratio was 13 under the measurement conditions of the first embodiment. In addition, light leaks from the liquid crystal response on the arrangement were blocked by the black stripe 603. Furthermore, the discrimination line of the orientation boundary was shielded from the light, and a uniform display was obtained. In addition, there was no directivity in the scattering when a voltage was applied, and a liquid crystal display device was obtained that possessed superior portability, visual properties and visibility. Furthermore, when a non-gray process and no-reflection coating were conducted on the surface of this liquid crystal display device, the pick up of the surroundings declined and the visibility improved dramatically.

In addition, with the present embodiment, reflective electrodes were placed on the MIM substrate, but it is also possible to form reflective electrodes on the opposing substrate.

Third Embodiment

Figure 7:
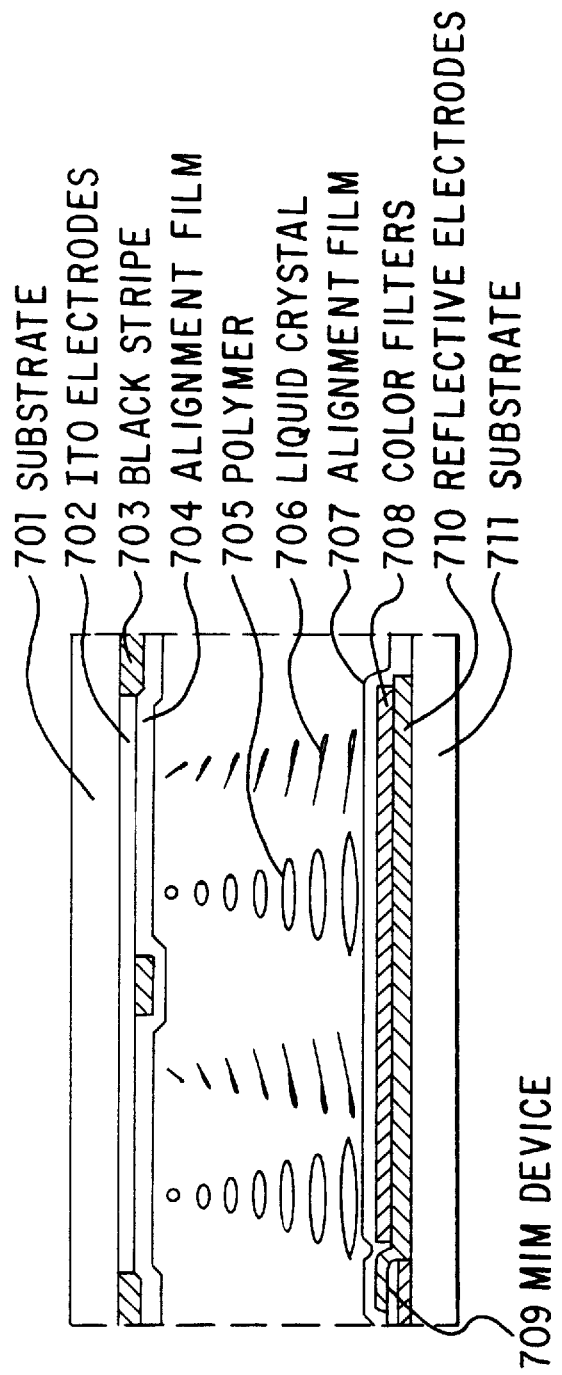
FIG. 7 is a cross-sectional view of the liquid crystal display device of a third embodiment of the present invention.

Hereafter, with the present embodiment an example is presented wherein a color filter is formed on the reflective electrodes in the structure of the second embodiment. FIG. 7 shows the cross-sectional view of the liquid crystal display device of the present embodiment. On the bottom substrate 711, wiring and a MIM device 709 and reflective pixel electrodes 710 were formed, the same as in the second embodiment. Pigment color filters 708 (red, green and blue) were formed at each pixel, respectively, on reflective pixel electrodes 710. On the other hand, an ITO electrode 702 and a black stripe 703 were formed on the top substrate 701, the same as in the second embodiment. The black stripe at the orientation boundary had a width of 10 $\mu$m. The liquid crystal display device of the present invention was completed using the above-described substrates 701 and 711, the same as in the second embodiment. The rubbing directions and orientation division pitches also had the same conditions as in the second embodiment.

The liquid crystal display device thus obtained was such that a black display was obtained through absorption of the two-color pigment when the voltage was off, and a color display was obtained by applying voltages on each color pixel.

In addition, when MIM driven at a 1/480 duty, the maximum reflectance was 31% and the contrast ratio was 12 under the measurement conditions of the first embodiment. In addition, an 8 gradation display and 512 color display were possible. In addition, light leaks from the liquid crystal response on the arrangement were blocked by the black stripe. Furthermore, the discrimination line of the orientation boundary was shielded from the light, and a uniform display was obtained. In addition, there was no directivity in the scattering when a voltage was applied. A liquid crystal display device was obtained that possessed superior portability, visual properties and visibility. Furthermore, when a non-gray process and no-reflection coating were conducted on the surface of this liquid crystal display device, the pick up of the surroundings declined and the visibility improved dramatically.

In the embodiments, reflective electrodes were placed on the MIM substrate, but it is also possible to place the reflective electrodes on the opposing substrate and to form color filters on the top thereof.

In addition, the composition of the color filters used in the embodiments is not restricted to red, green and blue, and it is also possible to use compositions such that natural colors can be reproduced. In addition, the color filters can also be placed on the top substrate.

This concludes the description of the embodiments of the present invention but the present invention is not limited to the above embodiments.

For example, in first through third embodiments, a bi-color pigment is added to the liquid crystal, but it is not necessary to add the pigment. If the pigment is not added, the black level increases slightly when voltage is not applied. When voltage is applied, there is no light absorption by the pigment, so the maximum reflectance increases, and brightness improves. Also, when low-reflectance, reflecting electrodes are used, or when a light absorption layer is placed on the reflecting electrodes, there is no particular necessity to add a bi-color pigment.

In addition, in the above-described embodiments 1 through 3, the structure described has twist angles of 89°, but this is intended to be illustrative and not limiting. The twist angle is preferably between 45° and 90°, and more preferably, between 70° and 90°. When the twist angle is smaller than 45°, the scattering directivity is strong and the visual properties become poor. In addition, when 90° is exceeded, a reverse twist domain is created.

In the above-described embodiments 1 through 3, a polyimide film was used as the orientation film utilized in the parallel orientation process, but besides this, polyamide film, SiO oblique vaporization film, polyvinyl alcohol, or the like may also be suitably used.

As the material used in the substrates, soda glass, quartz, non-alkali glass, silicon monocrystal, sapphire substrate, thermosetting polymer, thermoplastic polymer, or the like may be suitably used. The polymer material used in the substrates is not particularly limited as long as it does not have a negative effect on the liquid crystal and polymer contained between the substrates. PET, polyethyl sulfone, epoxy hardening resin, phenoxy resin, polyallyl ether or the like, may be suitably used.

The reflective electrodes are Cr in the first through the third embodiments, but a metal such as Al, Cr, Mg, Ag, Au, Pt or the like, or alloys of these, may be effectively used. In particular, Cr or an Al—Mg alloy are preferable from the standpoint of stability and reflectance, and in the case of the Al—Mg alloy, it is desirable that Mg be added in the amount of 0.1 to 10% by weight.

For the liquid crystal, what is normally used in liquid crystal display devices may be effectively used, but in order to improve the degree of scattering, it is desirable that the multiple refractivity anisotropy $\Delta n$ of the liquid crystal is equal to or greater than 0.15. Also, in order to drive a non-linear device, it is desirable that the relative resistivity values of the liquid crystal alone to be equal to or greater than $1.0 \times 10^9$ $\Omega \cdot cm$, and more preferably, be equal to or greater than $1.0 \times 10^{10}$ $\Omega \cdot cm$ in order to increase the retention rate and improve the display quality.

As the bi-color pigment, it is preferable to use azo, anthraquinone, naphthoquinone, perylene, quinophthalone, azomethyn or the like which are normally used in the GH (guest-host) display format. Of these, in terms of light-resistance, it is particularly preferable to use anthraquinone alone or a mixture of anthraquinone with another pigment, as necessary. These bi-color pigments may be mixed depending on the color needed.

As polymer precursors, any material can be used as long as it exhibits refractivity anisotropy after polymerization and the orientation disperses with the liquid crystal. From the standpoint of simplicity in the liquid crystal display device manufacture it is desirable to use an ultraviolet cured type monomer. For the ultraviolet cured type monomer, a monofunctional methacrylate, bifunctional methacrylate or multifunctional methacrylate are preferably used to improve the degree of scattering, it is desirable to include of these monomers, at least one benzene ring in the polymer structure. In particular, materials containing biphenyl, terphenyl or quarterphenyl lattice are desirable. These monomers may also contain a chiral component. Also, it is possible to irradiate these monomers with ultraviolet rays and polymerize them either alone or after mixing with other monomers.

In addition, in above-described embodiments 2 and 3, a MIM devices was used as the two terminal non-linear device, but it is also possible to use besides MIM devices, lateral MIM devices, back-to-back MIM devices, MSI devices, diode-ring devices or varistor devices. In addition, naturally it is also possible to use three terminal non-linear devices, and as the three terminal non-linear devices, it is possible to use polysilicon TFT devices, amorphous silicon TFT devices, Cd—Se TFT devices or the like.

INDUSTRIAL APPLICATIONS

As described above, with the present invention it is possible to resolve the problems of visibility caused by driving voltage and scattering directivity that were conventionally problems in polymer dispersion type liquid crystal display devices that are bright, have no double images and do not require polarizing plates, said problems being resolved through a structure that mutually disperses the polymer and divides the twisting direction of the liquid crystal that is twist oriented within the pixels.

In particular, the driving voltage of the liquid crystal display device of the present invention can adequately drive MIM devices and TFT devices because driving voltage has been reduced to being similar to that of the TN mode, and it is possible to greatly improve brightness and contrast. Through this, it becomes possible to improve the number of display colors and the visibility in the case of a reflective-type color liquid crystal display device. In addition the necessity of a high voltage-resistant driver disappears, and it is possible to reduce power consumption and costs. Accordingly, the present invention can be utilized in a reflective-type color liquid crystal display device that improves the number of display colors and the visibility and has low power consumption and low cost.

Furthermore, with the liquid crystal display device of the present invention, the brightness, visual properties and visibility were improved by suppressing the scattering directivity.

As a result, the present invention can be used in liquid crystal display devices suitable for portable applications for which numerous environments are predicted. In addition, the present invention can be used in reflective-type large capacity displays with active matrix driving, low power consumption and superior display quality.

We claim:

1. A liquid crystal display device comprising:
    a first substrate including a plurality of pixel electrodes and a first oriented surface;
    a second substrate including at least one second electrode facing the plurality of pixel electrodes and a second oriented surface; and
    a composition interposed between said first and second substrates comprising a liquid crystal and a polymer, wherein said liquid crystal and polymer are separated from each other;
    wherein:
        each pixel electrode defines a pixel of the liquid crystal display;

each pixel is divided into at least a right-twist orientation area and a left-twist orientation area; and within each pixel, the liquid crystal and the polymer are right-twist oriented between the first substrate and the second substrate in the right-twist orientation area, and the liquid crystal and the polymer are left-twist oriented between the first substrate and the second substrate in the left-twist orientation area.

2. The liquid crystal display device according to claim 1, wherein the size of the twisting angle of the liquid crystal in the right-twist orientation area and the size of the twisting angle of the liquid crystal in the left-twist orientation area are substantially equivalent.

3. The liquid crystal display device according to claim 1, wherein both the right and left twisting orientations are at a twisting angle of 45° to 90°.

4. The liquid crystal display device according to claim 1, wherein a light-shielding layer is formed on at least one of the first substrate and the second substrate between adjacent ones of the plurality of pixels.

5. The liquid crystal display device according to claim 1, wherein either the plurality of pixel electrode of the first substrate or the at least one second electrode of the second substrate are formed of a reflective material.

6. A liquid crystal display device comprising:
   a first substrate including a plurality of pixel electrodes and a first oriented surface, the pixel electrodes aligned in a two-dimensional array;
   a second substrate including a plurality of second electrodes facing the plurality of pixel electrodes and a second oriented surface, the second electrodes aligned in a two-dimensional array; and
   a composition interposed between said first and second substrates comprising a liquid crystal and a polymer, wherein the liquid crystal and polymer are separated from each other
   wherein:
      each pixel electrode defines a pixel of the liquid crystal display;
      each pixel is divided into at least a right-twist orientation area and a left-twist orientation area;
      in each pixel, the orientation direction of one of the first and second oriented surfaces in the right-twist orientation area and the orientation direction of the one of the first and second oriented surfaces in the left-twist orientation area are the same, and the orientation direction of the other of the first and second oriented surfaces in the right-twist orientation area and the orientation direction of the other of the first and second oriented surfaces in the left-twist orientation area are opposite;
      the right-twist orientation area and the left-twist orientation area of each pixel are adjacent to the left-twist orientation areas and the right-twist orientation areas, respectively, of vertically and horizontally adjacent pixels in the two dimensional array; and
      within each pixel, the liquid crystal and the polymer are right-twist oriented between the first substrate and the second substrate in the right-twist orientation area, and are left-twist oriented between the first substrate and the second substrate in the left-twist orientation area.

7. A method of producing a liquid crystal display device, comprising:
   forming a plurality of pixel electrodes over a first substrate, wherein each pixel electrode defines a pixel of the liquid crystal display;
   forming a first orientation layer over the plurality of pixel electrodes;
   forming at least one second electrode over a second substrate;
   forming a second orientation layer over the at least one second electrode;
   orienting one of the first and second orientation layers in a first direction in a first area of each pixel;
   orienting the one of the first and second orientation layers in a second direction in a second area of each pixel, wherein the second direction is opposite to the first direction and the second area is distinct from the first area;
   orienting the other of the first and second orientation layers in a third direction at a non-zero angle to both the first and second directions;
   forming a vacant panel by positioning the first substrate and the second substrate together so that the at least one second electrode of the second substrate face the pixel electrodes of the first substrate;
   placing a liquid crystal mixture material comprising a polymer and a liquid crystal compound between the positioned first and second substrates; and
   separating the polymer from the liquid crystal mixture so that the liquid crystal and the polymer are mutually separated, wherein, within each pixel, the liquid crystal and the polymer are substantially right-twist oriented in the first area of the pixel, and the liquid crystal and the polymer are substantially left-twist oriented in the second area of the pixel.

8. The method of producing a liquid crystal display device according to claim 7, wherein twisting angles of the first and second areas are substantially equivalent.

9. The method of producing a liquid crystal display device according to claim 7, wherein the twisting angle of the first and second areas is 45° to 90°.

10. The method of producing a liquid crystal display device according to claim 7, further comprising forming a light-shielding layer on at least one of the first substrate and the second substrate between adjacent ones of the plurality of pixels.

11. The method of producing a liquid crystal display device according to claim 7, wherein either the pixel electrodes or the at least one second electrode is formed of a reflective material.

12. A liquid crystal display device made by the process according to claim 7.

13. A method of producing a liquid crystal display device, comprising:
   forming a plurality of pixel electrodes over a first substrate, wherein each pixel electrode defines a pixel of the liquid crystal display;
   forming a first orientation layer over the plurality of pixel electrodes;
   forming at least one second electrode over a second substrate;
   forming a second orientation layer over the plurality of second electrodes;
   orienting one of the first and second orientation layers in a first direction in a first area of each pixel;
   orienting the one of the first and second orientation layers in a second direction in a second area of each pixel, wherein the second direction is opposite to the first direction and the second area is distinct from the first area;

orienting the other of the first and second orientation layers in a third direction at a non-zero angle to both the first and second directions;

forming a vacant panel by positioning the first substrate and the second substrate together so that the at least one second electrode of the second substrate face the pixel electrodes of the first substrate;

placing a liquid crystal mixture material comprising a polymer precursor and a liquid crystal compound between the positioned first and second substrates;

polymerizing the polymer precursor to form a polymer; and separating the polymer from the liquid crystal mixture so that the liquid crystal and the polymer are mutually separated, wherein, within each pixel, the liquid crystal and the polymer are substantially right-twist oriented in the first area of the pixel, and the liquid crystal and the polymer are substantially right-twist oriented in the second area of the pixel.

14. The method of producing a liquid crystal display device according to claim 13, wherein twisting angles of the first and second areas are substantially equivalent.

15. The method of producing a liquid crystal display device according to claim 13, wherein the twisting angle of the first and second areas is 45° to 90°.

16. The method of producing a liquid crystal display device according to claim 13, further comprising forming a light-shielding layer on at least one of the first substrate and the second substrate between adjacent ones of the plurality of pixels.

17. The method of producing a liquid crystal display device according to claim 13, wherein either the pixel electrodes or the at least one second electrode is formed of a reflective material.

18. A liquid crystal display device made from the process according to claim 13.

* * * * *